United States Patent [19]
Landseadel

[11] Patent Number: 5,153,492
[45] Date of Patent: Oct. 6, 1992

[54] SERVO AMPLIFIER

[75] Inventor: Bradley A. Landseadel, Hoffman Estates, Ill.

[73] Assignee: MSI Corporation, Barrington, Ill.

[21] Appl. No.: 387,847

[22] Filed: Jul. 31, 1989

[51] Int. Cl.$^5$ ............................................. G05B 11/28
[52] U.S. Cl. ................................. 318/599; 318/293; 318/278; 388/813
[58] Field of Search ................ 318/272–293, 318/430–434, 560–572, 599–620; 388/804–816

[56] References Cited

U.S. PATENT DOCUMENTS

| | | | |
|---|---|---|---|
| 3,525,029 | 8/1970 | Joslyn et al. | 318/599 |
| 3,743,911 | 7/1973 | Erler | 318/599 |
| 4,020,361 | 4/1977 | Suelzle et al. | 318/599 X |
| 4,099,297 | 7/1978 | Hasegawa et al. | 318/599 X |
| 4,268,782 | 5/1981 | Kawada et al. | 318/434 |
| 4,288,730 | 9/1981 | Graham | 318/599 |
| 4,300,081 | 11/1981 | Van Landingham | 318/599 |
| 4,368,411 | 1/1983 | Kidd | 319/599 X |
| 4,500,822 | 2/1985 | Tajima et al. | 388/813 |
| 4,523,134 | 6/1985 | Kinoshita et al. | 318/599 X |
| 4,562,393 | 12/1985 | Loyzim et al. | 318/599 |
| 4,760,316 | 7/1988 | Hedlund | 318/599 X |
| 4,800,324 | 1/1989 | Kuttner | 318/293 |
| 4,823,056 | 4/1989 | Watanabe et al. | 318/599 X |

Primary Examiner—Bernard Roskoski
Assistant Examiner—Paul Ip
Attorney, Agent, or Firm—Thomas R. Vigil

[57] ABSTRACT

The servo amplifier is used for driving power transistors supplying current to a D.C. servo motor. The servo amplifier includes a control signal input; a tach signal input; circuitry coupled to the inputs for creating an error signal between the control signal and the tach signal; a triangular wave generator for generating a triangular wave form; a summing network for summing the error signal with the triangular wave; a modulator for modulating the resultanat signal; tri-state drive logic circuitry; and power transistor drive circuitry adapted to be coupled to the power transistors. The triangular wave modulator is coupled to the output of the summing network for supplying modulated signals to the tri-state drive logic circuitry and the drive logic circuitry having outputs coupled to the drive circuitry. The tri-state drive logic circuitry provides fast response to the error signals indicating a desired change in speed of the D.C. motor, and without over-shoot or hunting of the D.C. servo motor.

5 Claims, 11 Drawing Sheets

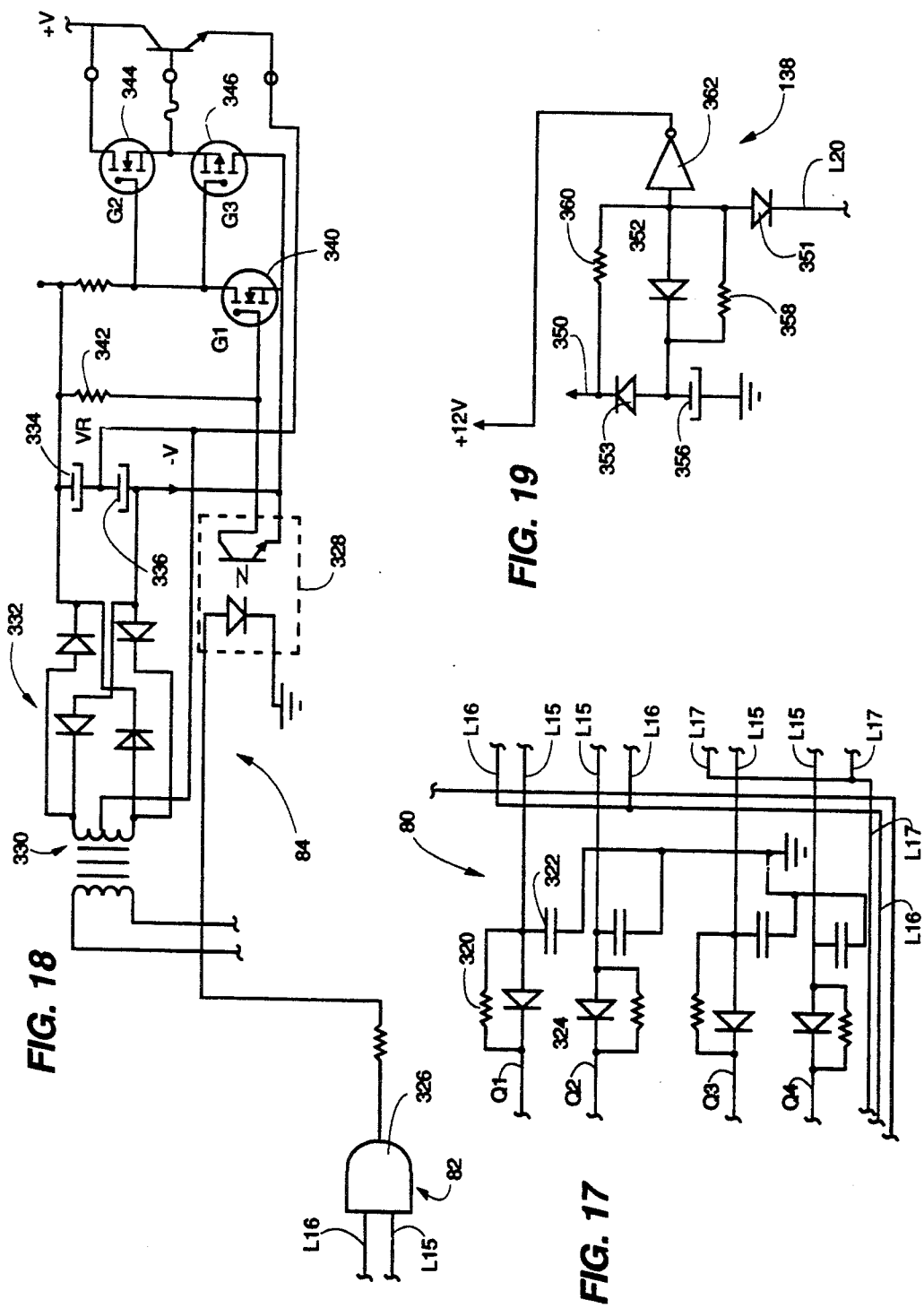

SERVO AMPLIFIER

BACKGROUND OF THE INVENTION

1. Field of the Invention

The present invention relates to a servo amplifier that is utilized for controlling the speed of a DC motor. More specifically, the present invention is directed to improvements in sub-circuits of the servo amplifier, including the provision of easily accessible resistance and potentiometer adjustments, high speed response to changes in the desired speed and in the response of the servo amplifier without hunting or over-shoot and a start-up delay circuit.

2. Description of the Prior Art:

Heretofore, servo amplifiers have been used in a number of environments for controlling the speed of a DC servo motor in response to a signal related to a desired speed. Examples of such servo amplifiers or servo electronic circuits are disclosed in the following U.S. Patents:

| U.S. Pat. No. | Patentee |
| --- | --- |
| 3,866,246 | Seamone et al. |
| 4,039,917 | Bach et al. |
| 4,081,731 | Wesner |
| 4,146,828 | Ross et al. |
| 4,204,143 | Coleman |
| 4,803,410 | Shinohara et al. |

The Seamone et al. U.S. Pat. No. 3,866,246 discloses a triangular wave generator and a pulse width modulator which are coupled to a power switching transistor circuit.

The Bach et al. U.S. Pat. No. 4,039,917 discloses an on-off servo controller generating a pulse-duration-modulated, error-compensating signal and includes a time delayed feedback voltage circuit.

The Wesner U.S. Pat. No. 4,081,731 discloses a pulse width modulated servo amplifier with over-current protection.

The Ross et al. U.S. Pat. No. 4,146,828 discloses a pulse-modulated servo amplifier.

The Coleman U.S. Pat. No. 4,204,143 discloses a pulse width modulated power amplifier direct current motor control.

The Shinohara et al. U.S. Pat. No. 4,803,410 discloses at variable duty ratio speed controller for DC motor.

As will be described in greater detail hereinafter, the servo amplifier of the present invention differs from the servo amplifiers disclosed in the patents referred to above by providing novel tri-state logic drive circuitry for effecting fast response of the servo amplifier to a change in the signal related to the desired speed, and more specifically, to the error signal generated thereby and fast response of the DC motor from its present speed to the desired speed with no over-shoot, or hunting.

Also, the servo amplifier of the present invention provides user adjustable controls for resistances and voltages in the circuit which are mounted for easy access to a user of the servo amplifier. Still further, the servo amplifier of the present invention includes a start-up delay circuit.

SUMMARY OF THE INVENTION

According to the invention there is provided a servo amplifier for supplying current to a D.C. servo motor, said servo amplifier including a control signal input; a tach signal input; circuit means coupled to the signal inputs for creating an error signal between the control signal and the tach signal; a triangular wave generator for generating a triangular wave form; first means for summing the error signal with the triangular wave; means for modulating the resultant signal including first comparator means having one input for receiving the sum of the error signal and the triangular wave, another input connected to system common, and an output, inverting amplifier means for receiving and inverting said error signal, second means for summing the inverted error signal with the triangular wave, second comparator means having one input for receiving the sum of the error signal and the triangular wave, a second input connected to system common, and an output; tri-state drive logic circuitry having a first input for receiving a non-inverted signal and a second input for receiving an inverted signal and comprising a first invertor coupled to said first input, a second invertor coupled to said second output, a third invertor, the output of said first invertor being supplied to said third invertor for providing an output Q1, a fourth invertor also coupled to said second input and having an output Q2, a fifth invertor coupled to the output of said second invertor and having an output Q3, and a sixth invertor alsoc oupled to said first input and having an output Q4; power transistors; and power transistor drive circuitry adapted to be coupled to said power transistors; said means for modulating being coupled to the output of said first and second summing means for supplying modulated signals from said outputs of said first and second comparator means to said first and second inputs of said tri-state drive logic circuitry, said tri-state drive logic circuitry having said Q1, Q2, Q3 and Q4 outputs coupled to said power transistor drive circuitry and said tri-state drive logic circuitry providing fast response to the error signals indicating a desired change in speed of the D.C. motor, and without over-shoot or hunting of the D.C. servo motor.

Further, according to the invention there is provided a servo amplifier, including a plurality of sub-circuits in which potentiometers and dip switches for adjusting resistances and voltage in the sub-circuits are provided, said servo amplifier including a circuit board having dip switches and potentiometers of said sub-circuits mounted thereon at the top of said servo amplifier for easy access by a user for adjusting the resistances and voltages in the sub-circuits by moving the dip switches and adjusting the potentiometers with a screwdriver.

BRIEF DESCRIPTION OF THE DRAWINGS

FIG. 17 is a detailed schematic circuit diagram of the crossover delay circuit shown in FIG. 3.

FIG. 18 is a detailed schematic circuit diagram of the power transistor drive circuit shown in FIG. 4.

FIG. 19 is a detailed schematic circuit diagram of the start-up delay circuit shown in FIG. 4.

DESCRIPTION OF THE PREFERRED EMBODIMENT

Figure 1:
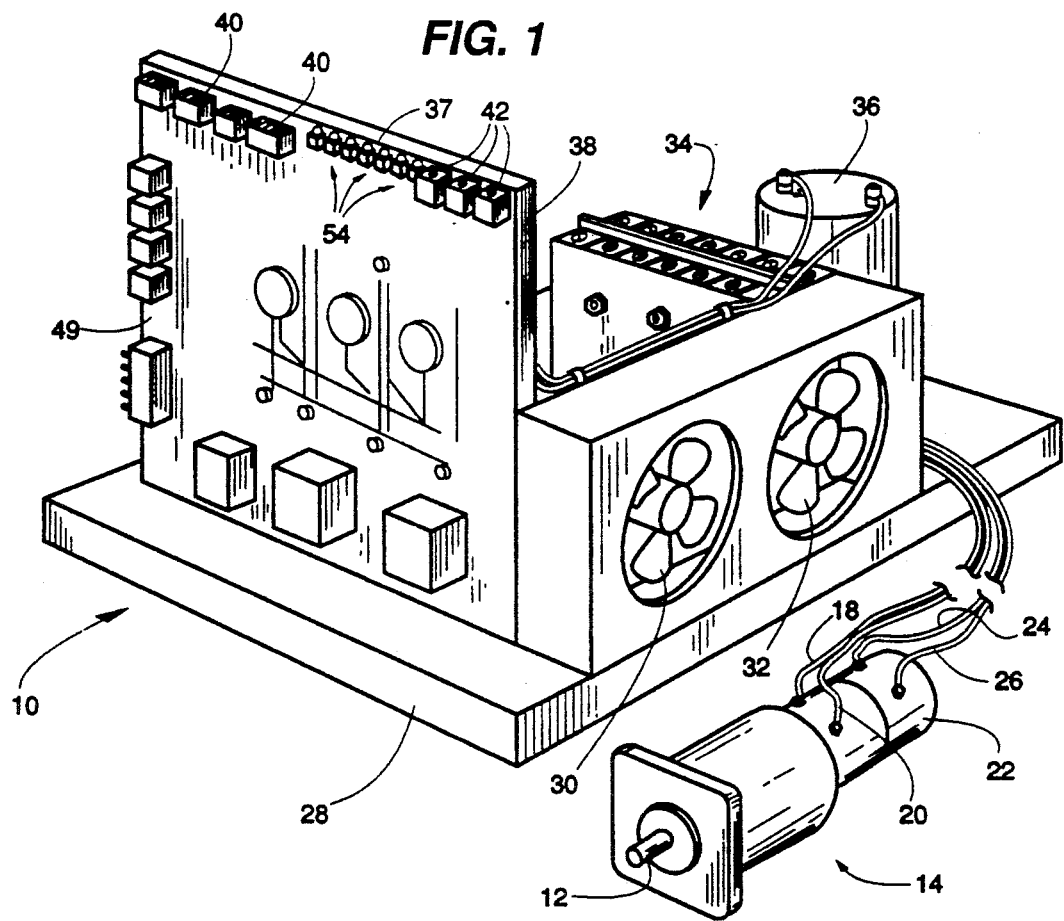
FIG. 1 is a perspective view of the electric circuit components.of a servo amplifier including a DC motor driven by the servo amplifier.

Referring now to FIG. 1 in greater detail, there is illustrated therein a perspective view of the major portion of a servo amplifier 10 constructed according to the teachings of the present invention. This servo amplifier 10 is utilized for controlling the rotational speed of a shaft 12 of a DC servo motor 14.

The DC servo motor 14 has leads 18 and 20 connected thereto from the servo amplifier 10 for supplying a controlled current to the DC servo motor 14 for controlling the rotational speed thereof.

Also connected to the shaft 12 of the motor 14 is a tachometer 22. The output of the tachometer 22 indicates to the servo amplifier 10, the actual, instantaneous rotational speed of the DC servo motor 14 and this output tach signal is supplied via leads 24 and 26 to the servo amplifier 10.

The servo amplifier 10 comprises a number of components which are mounted on a base board or plate 28. Among these components are fans 30 and 32 for providing cooling to the various circuit elements mounted on the base board 28, power supply circuitry 34 including a capacitor 36, and a drive circuit board 38 one or more of which may be mounted within the servo amplifier 10 for mounting sub-circuits of the servo amplifier 10.

As is known in the art, the power supply circuitry 34 includes not only the capacitor 36 but also diodes forming bridge circuits and a logic supply circuit.

According to the teachings of the present invention, the drive circuit board 38 has a number of circuit components mounted thereon in a particular arrangement, such as dip switches 40 and potentiometers 42 which are mounted along a top edge 37 (and, if desired, side edges) of the board 38 for enabling one to easily and quickly make adjustments to parameters of the circuitry 44 (FIGS. 3 and 4) of the servo amplifier 10 mounted on the board 38. Examples of the potentiometers 42 are as follows:

One or more potentiometers for controlling input logic configurations and potentiometers for controlling velocity compensation, signal gain, balance RMS current, peak current, tachometer gain and auxiliary gain.

In addition to the potentiometers, a number of dip switch assemblies 46 each mounting four dip switches 40 are provided and mounted along the top (and if desired, side edges) of the board. These dip switches 40 are utilized for controlling, for example, lead lag network compensation, differential input, lead, lag, single ended input and velocity or torque command input. Also, some of the switches 40 are used for controlling the total resistance in a current limiting circuit 48 shown in FIGS. 3, 4 and 7, particularly for limiting the peak current.

One dip switch assembly 46 (identified in a working prototype as S4) is for velocity loop compensation, and another (identified as S5 in the working prototype) is for input logic configuration.

In some environments, it is preferable only to have the dip switches and potentiometers mounted along the top edge 37 of the circuit board 38 for easy access and in those environments, no dip switches 40 or potentiometers 42 are located along a side edge 49 of the board 38 shown in FIG. 1.

Figure 2A:
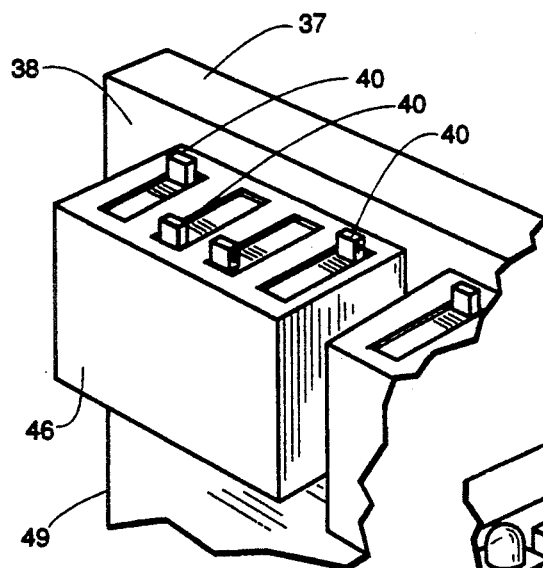
FIG. 2A is an enlarged fragmentary perspective view of an upper corner of a circuit board of the servo amplifier shown in FIG. 1 and shows adjustable dip switches positioned for easy access along and adjacent a top edge of the circuit board.
Figure 4:
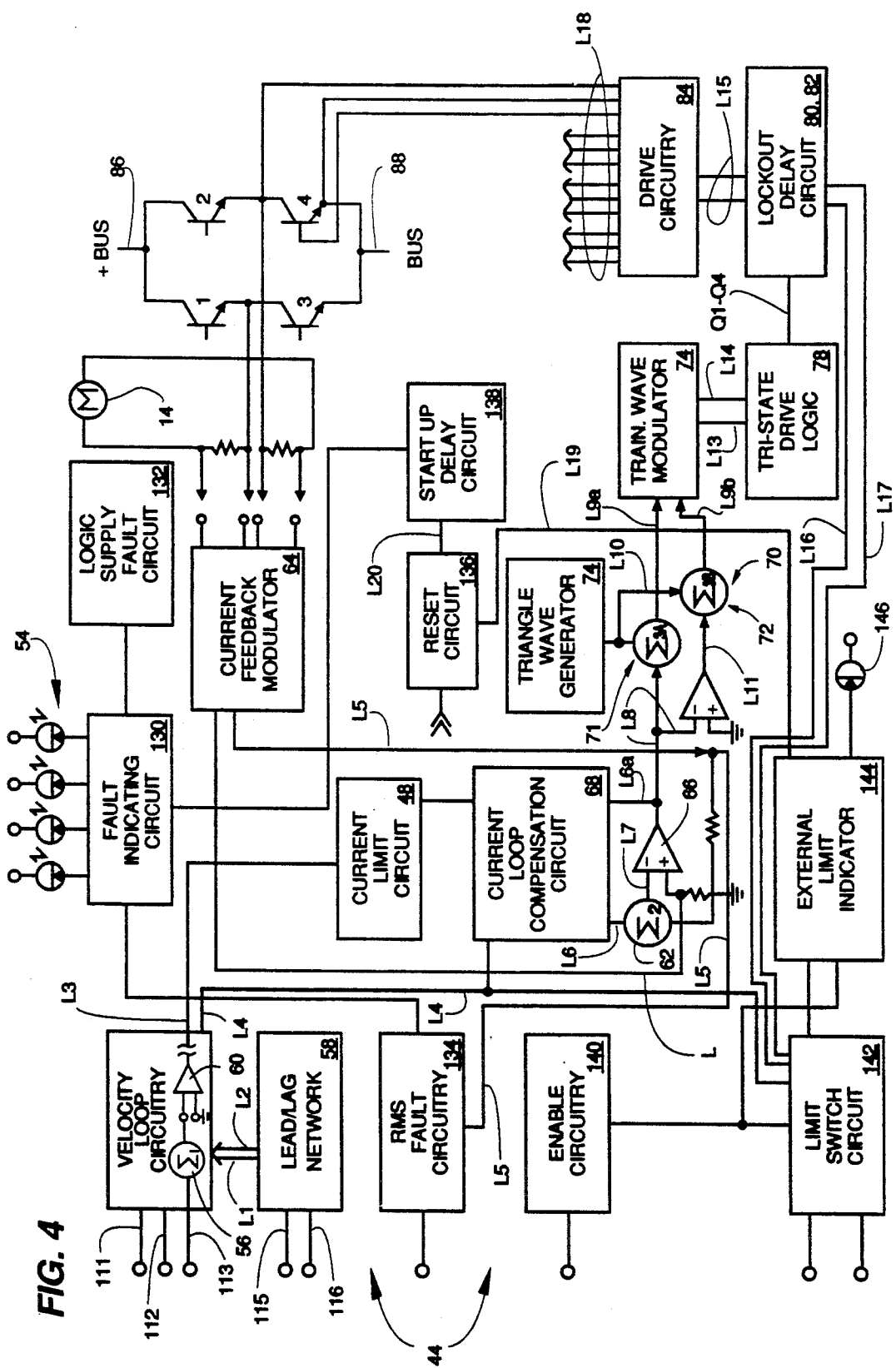
FIG. 4 is a more detailed block circuit diagram of the sub-circuits of the servo amplifier of the present invention.

One dip switch assembly 46, which is used for controlling the resistors in a velocity loop circuit 50 shown in FIG. 4, is shown in FIG. 2A.

Figure 2B:
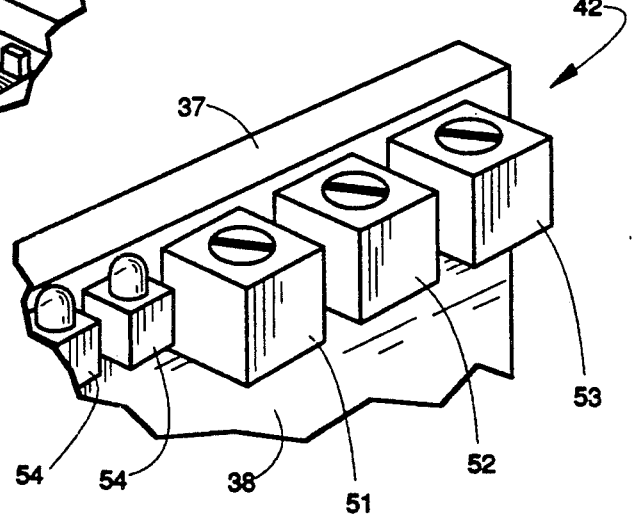
FIG. 2B is an enlarged fragmentary perspective view of screw adjustable potentiometers positioned for easy access along and adjacent an upper corner of the circuit board shown in FIG. 1.

In FIG. 2B are shown three potentiometers 42 which can be the potentiometers 51, 52 and 53 shown in the velocity loop circuitry 50 shown in FIG. 4. The dip switch assemblies 46 are particularly useful for controlling, setting or adjusting the peak current through the current limit circuit 48 shown in FIGS. 3, 4 and 7.

In addition to the dip switch assemblies 46 and potentiometers 42 mounted along a top edge 37 of the drive circuit board 38, there are also provided a number of light emitting diode assemblies 54 which are mounted so that light can be emitted upwardly at the top edge 37 of the drive circuit board 38 for indicating various status conditions and voltage conditions of the sub-switch on the drive circuit board 38.

As is well known in the art of servo amplifiers, the circuitry of a servo amplifier serves to control an output, such as the rotational speed of the shaft 12 of the DC servo motor 14 relative to a desired selected input speed represented by a certain voltage magnitude which is input into the servo amplifier. The input signal, namely a voltage magnitude representing a desired rotational speed of the servo motor 14, such as the speed of 1,000 rpm represented by a voltage of +5 volts DC, is supplied to the servo amplifier circuitry and summed with a tach input signal from the tachometer 22 which at the initial operation of the DC servo motor 14 will be a signal indicating 0 rpm.

The manner in which the servo amplifier 10 of the present invention achieves this control via servo amplifier circuitry 44 mounted on the drive circuit board 38 will now be described in greater detail in connection with the description of FIGS. 3 and 4.

Figure 3:
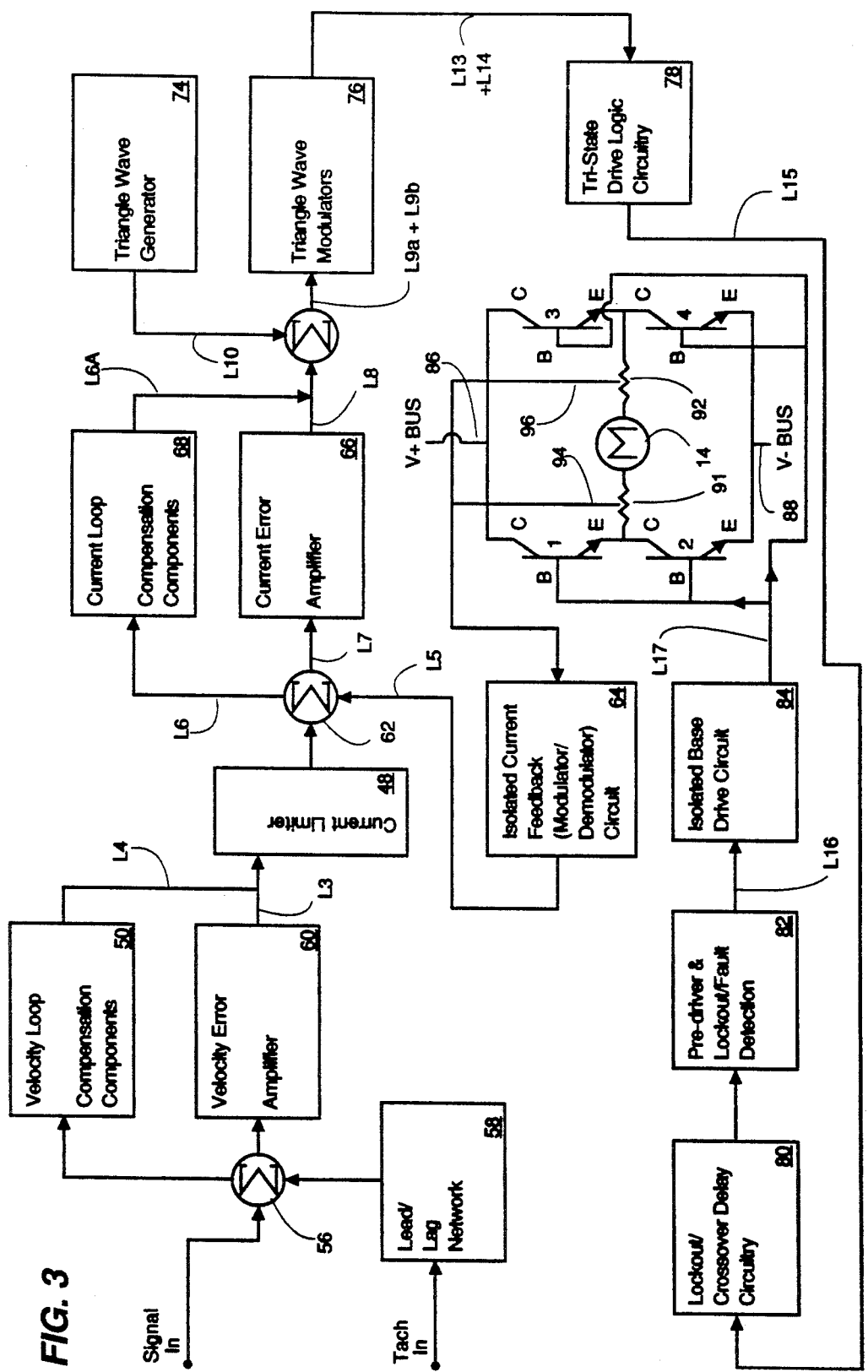
FIG. 3 is a simplified block circuit diagram of the sub-circuits assembles of the servo amplifier of the present invention.
Figure 9A:
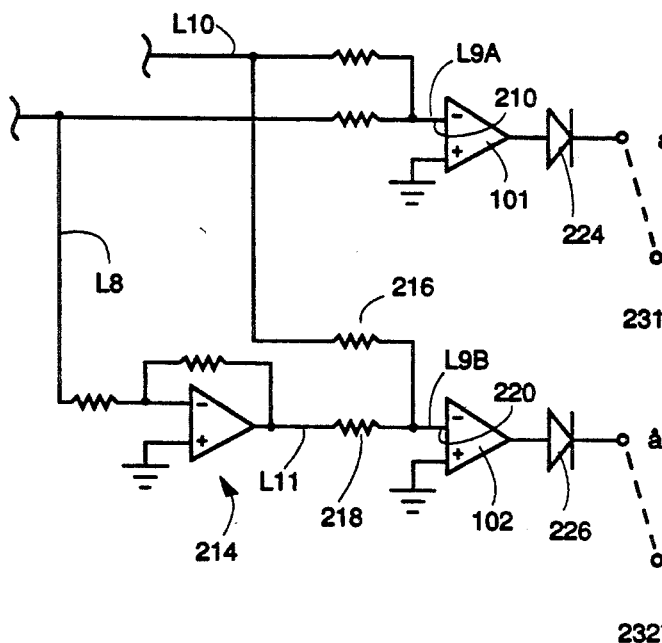
FIG. 9A is a detailed schematic circuit diagram of the summing and modulator circuit shown in FIG. 4.

FIG. 3 is a simplified block schematic circuit diagram of the circuitry 44 of the servo amplifier 10 of the present invention wherein only single lines are utilized to indicate connections between sub-circuits of the circuitry 44. A "signal in" representative of the desired speed of rotation of the servo motor 14 is supplied to a first summing network 56. At the same time, a signal from the tachometer labeled "tach-in" is supplied to a lead/lag network 58 and from there to the summing network 56. The summation from the summing network 56 is supplied to a velocity error amplifier 60 and to the velocity loop circuitry 50. The output from the amplifier 60 and loop circuitry 50 is supplied to the current limiter 48 and from there to a second summing network 62. The summing network 62 also receives an isolated current feedback signal (which is modulated and demodulated) from a current feedback circuit 64. The summation from the second summing network 62 is supplied to a current error amplifier 66 and to a current loop circuit 68. The output from both of these circuits 66 and 68 are supplied to a third summing network 70 which has a non-inverting summing section 71 (FIGS. 4 and 9A) and an inverting summing section 72 (FIGS. 4 and 9A).

A triangular wave generator 74 supplies a triangular wave to the third summing network 70 and thereby to the non-inverted and inverted summing sections 71, 72 thereof which form part of modulator 76. The output from these two summing sections 71, 72 of the summing network 70 is supplied to the triangular wave modulator 76.

The output from the triangular wave modulator 76 is supplied to novel tri-state drive logic circuitry 78 which provides a fast response to the error signal (the difference between the signal-in and the tach-in signals and the current feedback) and which throttles the current increase to the motor (M) 14 to prevent over-shoot and hunting.

The output from the tri-state drive logic circuitry 78 is supplied to lock-out/crossover delay circuitry 80, and from there through pre-driver and lock-out/fault detection circuitry 82 to an isolated base drive circuit 84.

The output from the base drive circuit 84 is fed to four power transistors 1, 2, 3 and 4 which are connected in an H bridge between a positive voltage bus 86 and a negative voltage bus 88.

As shown, the motor (M) 14 is connected in series with current-sensing resistor 91 and 92 between the emitter and collector of transistors 1 and 2 respectively and the emitter and collector, respectively of transistors 3 and 4. Current sensing taps 94 and 96 are connected to the current sensing resistors 91 and 92 for supplying feedback current to the current feedback circuit 64.

The servo amplifier 10 is a device which is used to amplify a low current, low amplitude signal into a high current, high voltage signal. This is necessary to provide the appropriate signals to drive the DC servo motor 14.

The velocity loop circuitry 50 has two inputs. These inputs are the "signal in" and the "tach in" signals. When the motor 14 is at NULL (zero speed) very little tachometer or signal input is present. A signal input at the input of the velocity error amplifier 60 is a command for speed. The speed itself is predicated by the ratio between the gain of the "signal in" and the gain of the "tach in" signals, the available voltage to the motor 14 and the motor back EMF constant.

The "signal in" and the "tach in" are summed in at summing network 56 to produce what is known as the "Velocity Error Signal". This error is amplified by the velocity error amplifier 60 and the output of the amplifier 60 is known as the "Current Command Signal".

There is another summation in summing network 62 made between the Current Command Signal from the current limiter 48 and the Current Feedback Signal from the current feedback circuit 64. The Current Feedback Signal is a voltage proportional to the motor armature current. Thus, any difference between the Current Command and the Current Feedback signals is a current error. This error is amplified and compensated by the Current Error Amplifier 66 and the current loop 68.

The amplified current error signal is summed with yet another signal in summing network 70 (71, 72). This summation is of the Triangular Wave Form from the triangle wave form generator 74 with the current error signal. These summed signals, non-inverted (summing section 71) and inverted (summing section 72), are brought to the inputs of comparator 101, 102 in modulator 76 (FIG. 9A) which outputs pulse width modulated square wave signals with the frequency of the triangle wave from the triangle wave generator 74.

The outputs of the modulator 76 are conditioned and then supplied to the inputs of the tri-state drive logic circuitry 78. The drive logic circuitry 78 varies the control signal such that no output occurs during a fault condition and that no output occurs between a top and bottom transistors (1, 2 or 3, 4) in the "H Bridge" of power transistors 1–4.

Finally, the outputs of the Tri-State Drive Logic Circuitry 78 drives the Base Drive circuitry 84 through Optically Coupled Isolators as will be described in great detail below in connection with the description of FIG. 18. The Base Drive Circuitry 84, in turn, drives the power transistors 1–4 that are connected to the armature of the motor 14.

Referring now to FIG. 4, there are three inputs 111, 112, 113 supplied to the servo amplifier circuitry 44 for indicating to the circuitry 44 what the desired rpm is for the motor 14. These include an auxiliary signal input line 111 and two primary signal input lines 112, 113 by which a desired voltage is supplied to the velocity loop circuitry 50. At the same time, a tachometer signal is being supplied to the lead/lag network 58 via leads 115 and 116. The tachometer signal is summed with the input signal in summing network 56.

A signal input for the desired rpm can be 5 volts representing, for example, 1,000 rpm. At the same time, a tach input is supplied to the lead/lag network 58 and from there to the first summing network 56.

Figure 5:
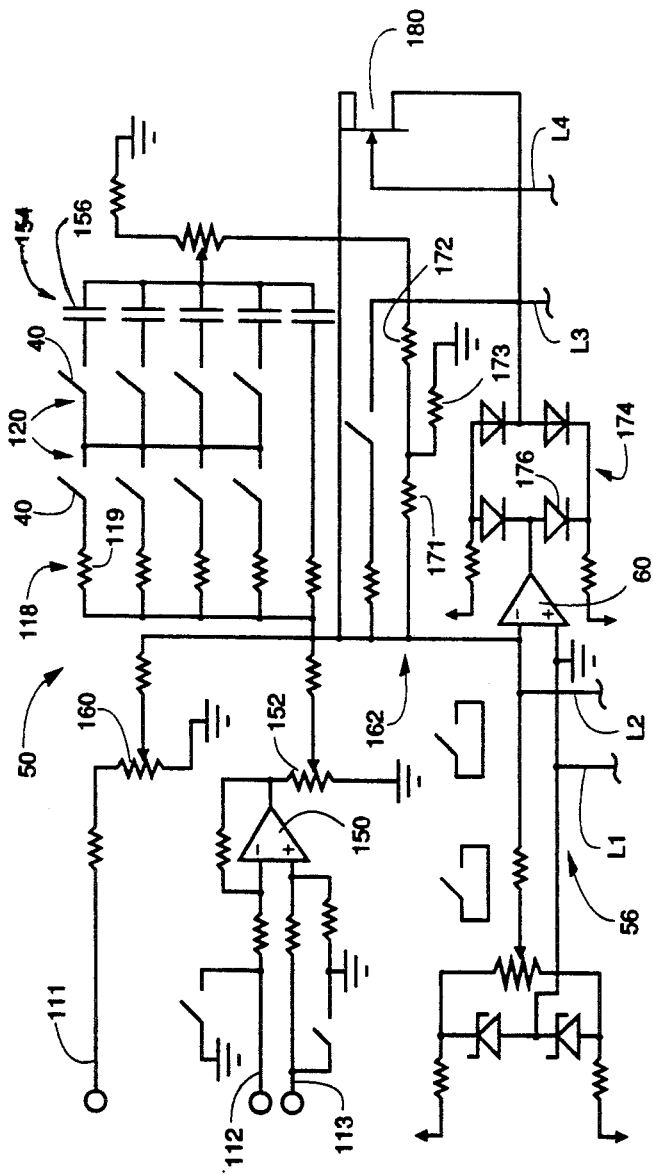
FIG. 5 is a detailed schematic circuit diagram of the velocity loop circuitry shown in FIG. 4.

The output from the summing network 56 is supplied to the velocity loop 50 including compensation components, such as a bank 118 of resistors 119 controlled by a bank 120 of dip switches 40 (as shown in FIG. 5) and to the velocity errors amplifier 60.

Figure 7:
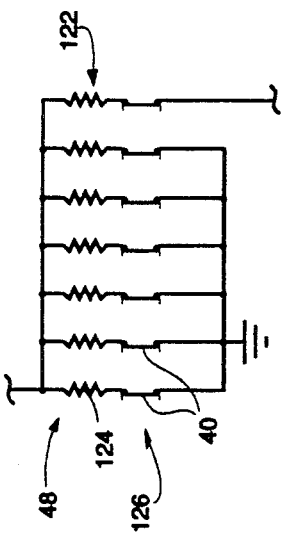
FIG. 7 is a detailed schematic circuit diagram of the current limit circuit shown in FIG. 4.
Figure 6:
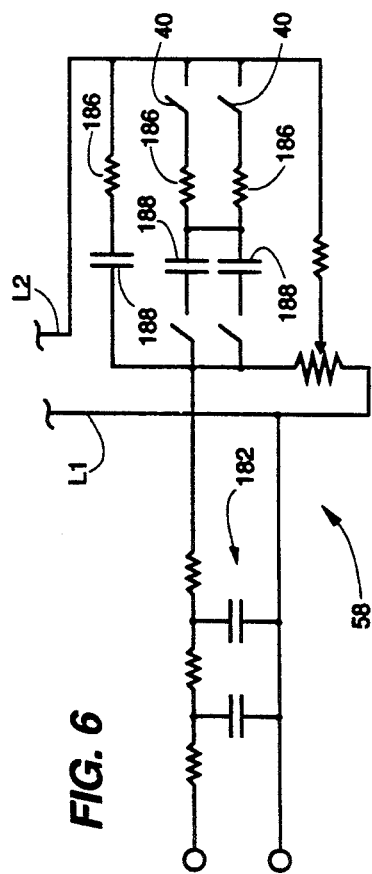
FIG. 6 is a detailed schematic circuit diagram of the lead/lag network shown in FIG. 4.

The output of the velocity error amplifier 60, indicating the amount of correction or increase in current that the servo amplifier 10 needs to supply to the servo motor 14 in order to increase the speed from 0 to 1,000 rpm, is represented by the output from the velocity error amplifier 60. This current is supplied to the current limit circuit 48 which limits peak currents and which includes a bank 122 of resistors 124 as shown in FIG. 7 which are added to or taken out of the current limit circuit 48 by the operation of a bank 126 of dip switches 40 shown in FIG. 7. The output from the current limit circuit 48 is supplied to a current loop compensation circuit 68 and from there to the current error amplifier 62. The output from the current error amplifier 62 is the current error signal for controlling the operation of the servo motor 14 and is supplied to the third summing network 70.

It should be noted that to the second summing network 62 there is supplied via conductor line L5, a feedback current signal representative of the current presently being supplied to the servo motor (M) 14 from the isolated current feedback circuit 64 and this current is picked up from current flowing through the motor current sensing resistors 91 and 92.

The triangle wave generator 74 is provided for supplying a triangular wave form to the third summing network 70 which also receives the current error signal which is summed with the triangular wave form.

The output signal from the summing network 70 is supplied to the triangular wave modulator 74 for modulating the triangular wave relative to the current error signal.

The output from the modulator 74 is then supplied to the tri-state drive logic circuitry 78 which provides feedback control signals to the drive circuitry 84 described hereinafter in greater detail.

The output from the tri-state drive logic circuitry 78 is passed through delay and lockout circuitry 80, 82 and from there to the base drive circuitry 84. The output from the base drive circuitry 84 is supplied to the bank of four power transistors 1, 2, 3 and 4 which control the flow of DC current to the motor (M) 14.

A fault indicating circuit 130 derives fault information or signals from various fault circuits. They are as follows: a logic supply fault circuit 132, an RMS fault circuit 134, an over-current fault circuit (not shown), a bus voltage fault circuit (not shown) and a temperature fault circuit (not shown).

As shown in FIG. 4, connected to the fault indicating circuit 130 are several of the light emitting diodes 54 shown in FIG. 1 and the logic supply fault circuit 132.

A reset circuit 136 is provided coupled to a start up delay circuit 138 which inputs into the fault indicating circuit for clearing the fault indication when the servo amplifier circuitry 44 is reset.

Also provided in the servo amplifier circuitry is enable circuitry 140 which enables the servo amplifier circuitry 44 to receive and respond to a signal input and a tach signal. The output of the enable circuitry 140 is connected to a limit switch circuit 142 and to an external limit indicator circuit 144 which is coupled to the reset circuitry 136 and which has an LED output The limit switch circuit 142 has a conventional "left limit" input and a conventional "right limit" input as shown.

The construction and operation of several of the foregoing identified subcircuits will now be described in greater detail in 30 connection with the description of FIGS. 5-9B.

Turning now to FIG. 5, there is illustrated therein the circuit components of the velocity loop circuitry 50.

The voltage input is supplied to lines 112 and 113 and that voltage is supplied to a differential amplifier 150. The output of the differential amplifier 150 is fed to a potentiometer 152 which supplies the bank 118 of resistors 119 and a bank 154 of capacitors 156. These resistors 119 and capacitors 156 control the integral AC gain and band width of the velocity loop circuit 50; and the particular resistor 119 and/or capacitor 154 that is inserted into the circuit 50 is determined by the opening or closing of one 0r more of the dip switches 40.

The auxiliary input 111 can be provided through a potentiometer 160 to the velocity loop circuit 50.

A balancing circuit 162, to compensate for offsets, is provided and coupled to the output of the differential amplifier 150 and the velocity loop amplifier 60 functions to sum up the signals from the auxiliary input 111, from the differential amplifier 150, from the balancing circuit 162 and from the output of the lead/lag network 58 which has its input lines 115, 116 coupled to the tachometer.

The resistors 171, 172 and 173 form a T resistive network which sets the integral DC gain for the velocity loop circuit 50.

The output from the amplifier 60 is supplied to a diode network 174 which functions to reduce the maximum output without reducing the gain of the amplifier 60.

This diode circuit 174 comprising the four diodes 176 works in conjunction with the resistors 124 in the current limit circuit 48 which are input into or taken out of the servo amplifier circuitry 44 by operation of one of the dip switches 40 shown in FIG. 7.

A field effect transistor 180 is provided in the velocity loop circuitry 50 for resetting the velocity loop circuitry 50 on start-up of the servo amplifier circuitry 44 and functions as a gain clamp in the velocity loop circuit 50. The output from the velocity loop circuit 50, in the form of a current command voltage is output from the velocity loop circuit or conductor line L3.

The lead/lag network 58 includes a filter circuit 182, the output of which is coupled to a potentiometer 184 and to resistors 186 and capacitors 188, several of which can be switched in or out of the circuit 58 for adjusting the lead or lag by means of dip switches 40 which, as described above, are mounted along the top edge 37 of the circuit board 38 shown in FIG. 1.

The current limit circuit 48 shown in FIG. 7 has been referred to previously and includes a bank 122 of resistors 124 and a bank 126 of dip switches 40 which are adapted to be connected to the output of the velocity loop circuit 50 for controlling the maximum amount of voltage at the output of the diode circuit 174.

Figure 8:
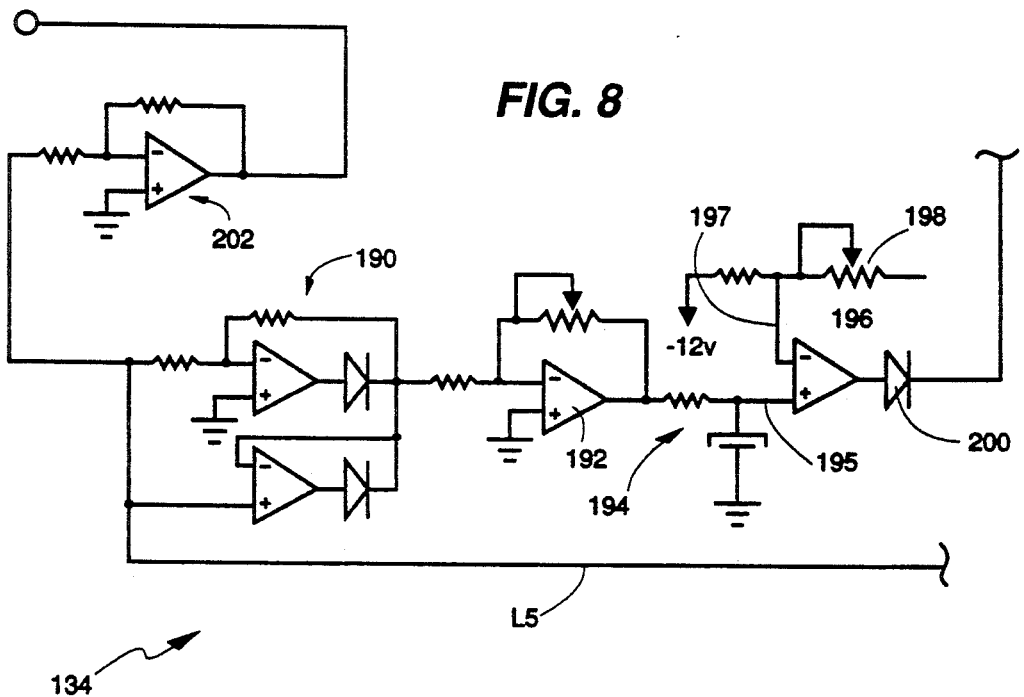
FIG. 8 is a detailed schematic circuit diagram of the RMS fault circuitry shown in FIG. 4.

Turning now to FIG. 8, the RSM fault circuitry 134 receives an input signal from the current feedback modulator 65 via conductor line L5 and supplies this signal to an absolute value circuit 190, the output of which is supplied to an amplifier 192. The output from the amplifier 192 is supplied to an RC circuit 194, the output of which is stabilized at a DC level by the capacitor C and supplied to one input 195 of the comparator 196. The other input 197 of the comparator 196 receives a voltage set by a potentiometer 198 which sets the level at which the comparator 196 will "trip". The output of the comparator is supplied through a diode 200 to the fault indicating circuitry 130.

The input on conductor L5 is also supplied to an indicator circuit 202 which gives an indication of the current coming out of the current feedback modulator/demodulator circuit 64 which is used by the customer to see what kind of current level is being received by the servo motor.

The RSM fault circuitry 134 is unique in having two adjustments, one being the adjustment of the amplifier 192 which typically is a factory set potentiometer adjustment 204 and the other being the fault level setting set on the potentiometer 198 which sets the level that is compared by the comparator 196. For this arrangement of the two potentiometers 198 and 204, the customer can only adjust the potentiometer 198 and in that way only can the absolute RSM value be adjusted downwardly but not upwardly.

Figure 9B:
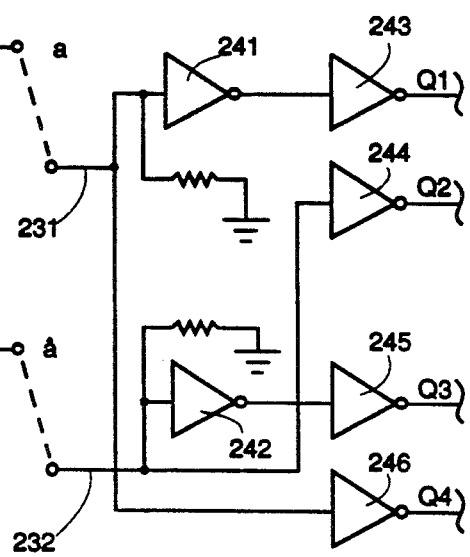
FIG. 9B is a detailed schematic circuit diagram of the tri-state drive logic circuitry coupled to the output of the modulator shown in FIG. 4.

Referring now to FIGS. 9A and 9B in greater detail, the output from the third summing network 70, including summing sections 71 and 72, is supplied to the triangle wave modulator circuit 74 shown in detail in FIG. 9A. In the modulator circuit 74 shown in FIG. 9A, the triangle wave is supplied to the first section 71 of the summing network 70 and is summed directly with the earth (ground) signal via resistors 206 and 208 and the summation of those signals is supplied to the minus input 210 of the comparator 101.

At the same time, the error signal is supplied via conductor line L8 to an inverter circuit 214 and then the inverted error signal is summed with the triangle wave in a second section 72 of summing network 70 via resistors 216 and 218 and this sum is supplied to the negative input 220 of the other comparator 102.

The outputs of both comparators are then fed through diodes 224 and 226 separately and then supplied to the tri-state drive logic circuitry 78.

In this way, there is provided a non-inverted modulated error signal and an inverted modulated error signal supplied to the two inputs 231 and 232 of the tri-state drive circuit 78, namely output signal a and an inverted output signal â. The signal a (a summation of the error signal and the triangular wave) is supplied to the input 231 of the tri-state drive logic circuit 78 and the inverted signal â (a summation of the triangular wave and the inversion of the error signal) is supplied to input 232 of the tri-state drive logic circuit 78.

The tri-state drive logic circuit 78 shown in FIG. 9B will now be described in greater detail with reference to the timing diagram shown in FIG. 10. As shown in FIG. 9B, the tri-state drive logic circuit 78 includes first and second inverters 241 and 242. The output of the inverter 241 is supplied to another third inverter 243 to provide one output Q1. The input 232 is also connected to a fourth inverter 244 having an output Q2.

The output of the inverter 243 is supplied to a fifth inverter 245 which then supplies an output Q3. Finally, the input 231 is also supplied to a sixth inverter 246 that supplies an output Q4.

In the operation of the tri-state drive logic circuit 78, a triangular wave, as shown in graph 10A, is summed with the error signal and with an inversion of the error signal These summations of a and â, as supplied to the inverters 241-246 shown in FIG.9B, result in outputs Q1, Q2 in the form of positive square pulses.

Referring to graphs 10A-10E in FIG. 10 and to FIG. 9B, it will be clear that following the path from the summation of the error signal via resistors 206 and 208, a +5 volt error signal plus the triangular wave will give a +10 volt error signal (−5 to +5) so that there will be at the negative input 212 a greater value signal than at the output of the comparator 101. When the comparator 101 sees a plus voltage at the minus input 210, its output will be minus 12 volts which will be a low and that low is then supplied to the inverter 241 which inverts it to a plus 12 volts and then it is inverted again by the inverter 243 to a minus 12 volts. The diode 224, then seeing a negative voltage, will have an output of 0 and that 0 voltage then stays at 0 through inverters 241 and 243 and Q1 will remain at 0 until the time when the negative portion of the triangular wave is less than or equal to minus 5 volts at which point in time it will cause the inverter 241 to see a positive voltage which is inverted to a negative voltage and then inverter 243 inverts the negative voltage to a positive voltage and we get the pulse 248 at output Q1 as shown in FIG. 10E.

Then looking at graph 10D, it will be clear that when the inverted signal supplied to the comparator 102 combined with the triangular wave is at a value above +5 volts we get a pulse 250 at the output Q2.

Figure 10A:
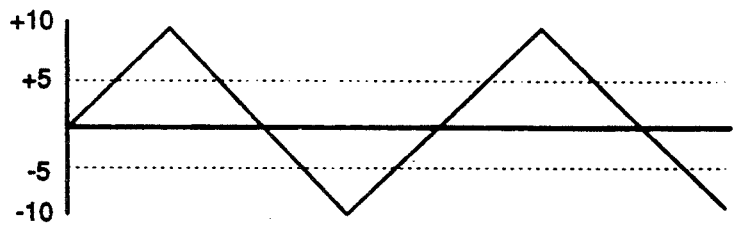
FIGS. 10A–10F are graphs of wave forms showing the current at different points in the tri-state drive logic circuitry shown in FIG. 9.
Figure 10B:
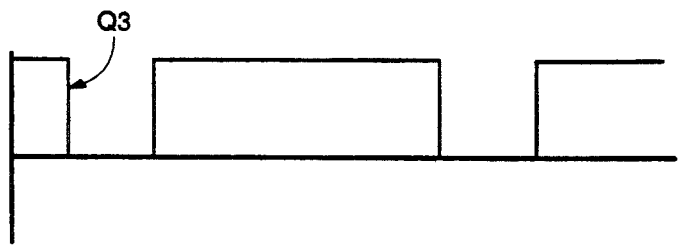
Figure 10C:
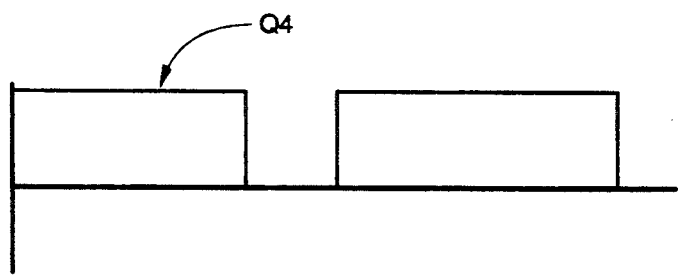
Figure 10D:
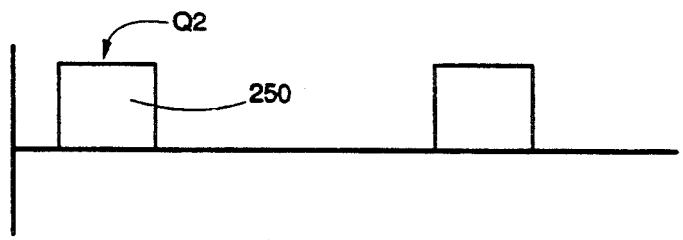
Figure 10E:
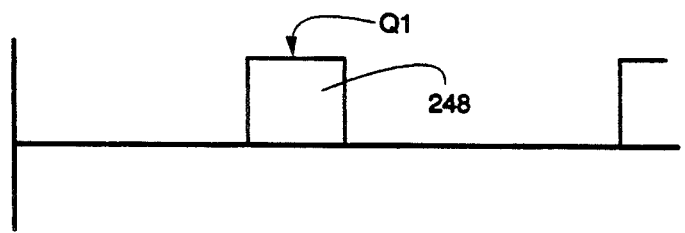
Figure 10F:
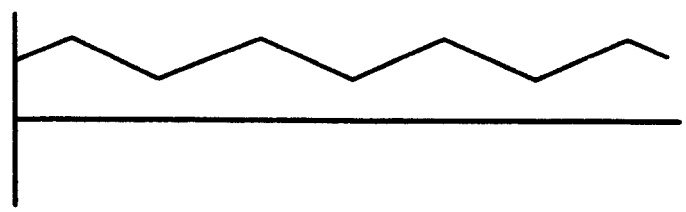

Looking at the output Q3, we first have an inverted signal supplied through the resistor 218 and that will result in a minus 5 volts added to the triangular wave being supplied through the resistor 216. As a result and as shown in FIG. 10B, while the triangular wave is going from 0 to plus 5 volts the summation in the comparator 102 is negative and that negative output supplies a 0 or low through the output of the diode 226 which is supplied to the inverter 242 which inverts it to a plus value or a high at the output of inverter 242.

When the negative input 220 of the comparator 102 is negative and that's while the triangular wave has gone from 0 to plus 5 volts, that will provide a positive output from the comparator 102 which is supplied through the diode 226 to the inverter 242 which inverts that to a negative or low and then the inverter 245 inverts that negative output to a positive high so we get an output pulse at Q3 as shown in graph 10B of FIG. 10 until the triangular wave reaches a plus 5 volts. At that time, the output Q3 will go to a low of 0.

Now at the same time this is happening, it will be seen that the output from the diode 224 which is inverted at inverter 241 is also sent directly to an inverter 246 which supplies the output Q4. As long as the output of the diode 224 is low, the output of Q4 will be high as shown in graph IOC. By the same token, so long as the output of diode 226 is high, the output Q2 will be low and then to go a high when the triangular wave goes above +5 volts as shown in graph 10D. As a result, the value of the output Q3 will always be the opposite of the value of the output Q2 and the value of the output Q4 will always be the opposite of the value of the output Q1.

Figure 11A:
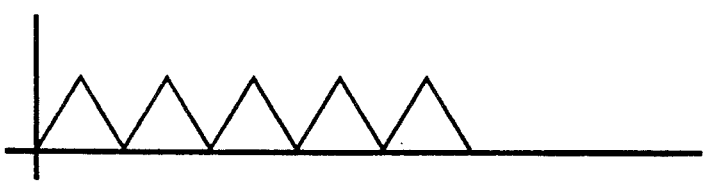
FIGS. 11A, 11B and 11C are graphs of the triangular wave form from the triangular wave form generator, the output from the current error amplifier, and the inverted output from the current error amplifier.
Figure 11B:
Figure 11C:
Figure 12A:
FIG. 12A is a graph of the triangular wave form with an error signal, represented by the difference between two voltage levels, superimposed on the triangular wave form.
Figure 12B:
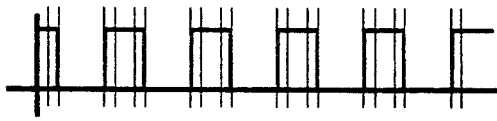
FIG. 12B is a graph of the pulses from the current error amplifier as demodulated.
Figure 12C:
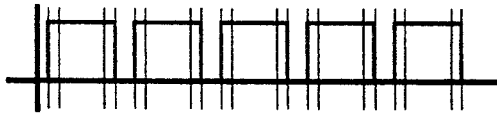
FIG. 12C is a graph of the wave form of the inverted current error pulses as demodulated.
Figure 12D:
FIG. 12D is a graph of the wave forms of the demodulated output pulses as supplied from the tri-state drive logic to the power transistors.
Figure 13A:
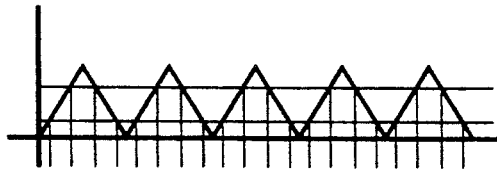
FIGS. 13A–13D are graphs of wave forms similar to the graphs of wave forms shown in FIGS. 12A–D except with a larger error signal is superimposed upon the triangular wave form.
Figure 13B:
Figure 13C:
Figure 13D:

Graph 10F is a graph of the current seen by motor 14 from the power transistors 1-4 after the outputs Q1-Q4 pass through the lockout delay circuit 80,82 and the drive circuit 84. What graph 10F shows is that when the outputs Q3 and Q4 are high, there is an increase in current to the motor 14. Then when one of them or the other of them is off, there is a decrease in current to the motor 14. As the error voltage increases, you will get more and more current to the motor 14 and as the error voltage decreases you get less and less current to the motor 14. The drive pulses to the bases of the bi-polar power transistors 1-4 is graphically represented in FIGS. 11-13; FIG. 12D shows the drive pulses for a small error signal and FIG. 13D shows the drive pulses for a large error signal.

FIGS. 14A-14D illustrate the current flow through the power transistors 1-4 during a three state acceleration of current flow and the four periods that occur in this acceleration are shown respectively in FIGS. 14A, 14B, 14C and 14D. Stated in another manner, FIGS. 14A-14D show the current flow through the power transistors 1-4 and a coil 300 of the motor after the outputs Q1-Q4 have passed through the crossover delay circuit shown in FIG. 7, to be described in greater detail hereinafter, and through four drive circuits 84 (one of which is shown in FIG. 18) to each of the bi-polar power transistors 1-4.

Figure 14A:
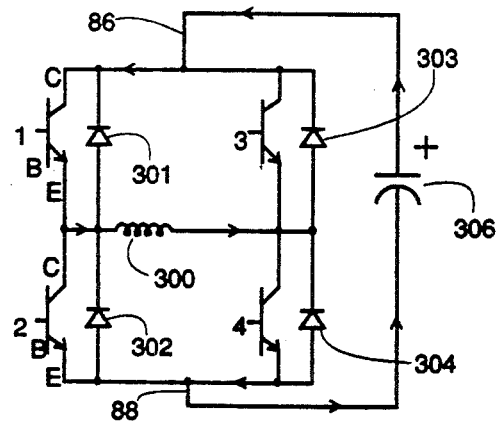
FIGS. 14A–14D are circuit diagrams of the motor coil and the power transistors for driving same and shows periods or modes of three-state acceleration of the power transistors as driven by the tri-state drive logic circuitry shown in FIG. 9B.

As shown in FIG. 14A, the bridge of power transistors 1-4 includes the motor coil 300 connected between on one side the emitter of transistor 1 and the collector of transistor 2 and on the other side to the emitter of transistor 3 and the collector of transistor 4. Also, connected across each one of the power transistors (from the emitter to the collector) is a diode 301, 302, 303 or 304, as shown. Also, connected across the positive voltage bus 86 and the negative voltage bus 88 is a bus capacitor 306. In the first period shown in FIG. 14A, the transistors 1 and 4 conduct with current flowing in the manner shown by the arrows. This current flow is from the emitter of transistor 1 through the coil 300 through the collector and emitter of transistor 4 through the capacitor 306 and back to the emitter of transistor 1.

Figure 14B:
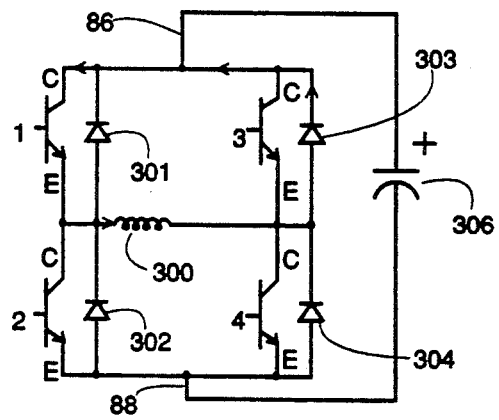

As shown in FIG. 14B, period two is illustrated in which the difference between a two state acceleration and a three state acceleration is apparent. Here, transistor 4 turns off and the inductive energy is recovered via a short circuit around transistor 1 and the diode 303 across transistor 3. This creates a slower decay rate depending on the load resistance than in a two state operation.

The current flow is indicated by the arrows in FIG. 14B and flows from the emitter of transistor 1 through the motor coil 300 through the diode 303 and back to the collector of transistor 1.

Figure 14C:
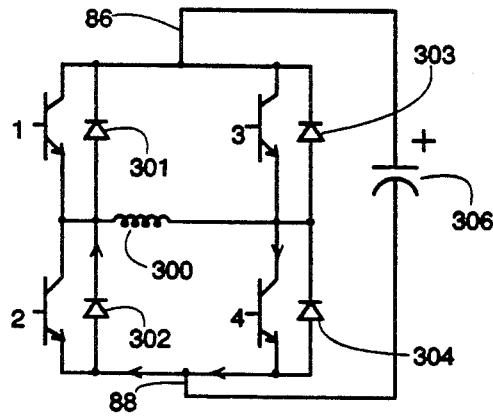

In FIG. 14C, there is shown the current flow in the third period which is identical to the current flow in the first period. Here again, the current flows from the emitter of transistor 1 through the coil 300 across the collector-emitter of the transistor 4 through the capacitor 306 and back to the collector of the transistor 1.

Figure 14D:
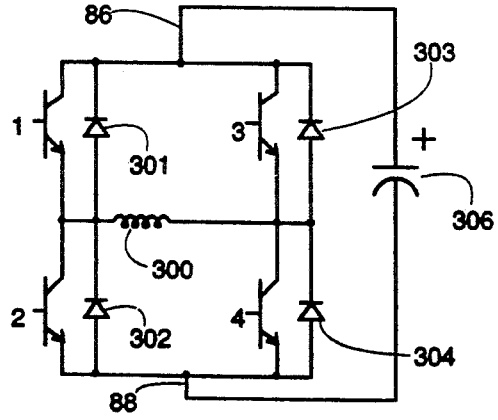

In period four, shown in FIG. 14D, the transistor 1 is now turned off and current flows through transistor 4 from the collector to the emitter as shown by the arrows through the diode 302 through the coil 300 and back to the collector of the transistor 4.

Figure 15:
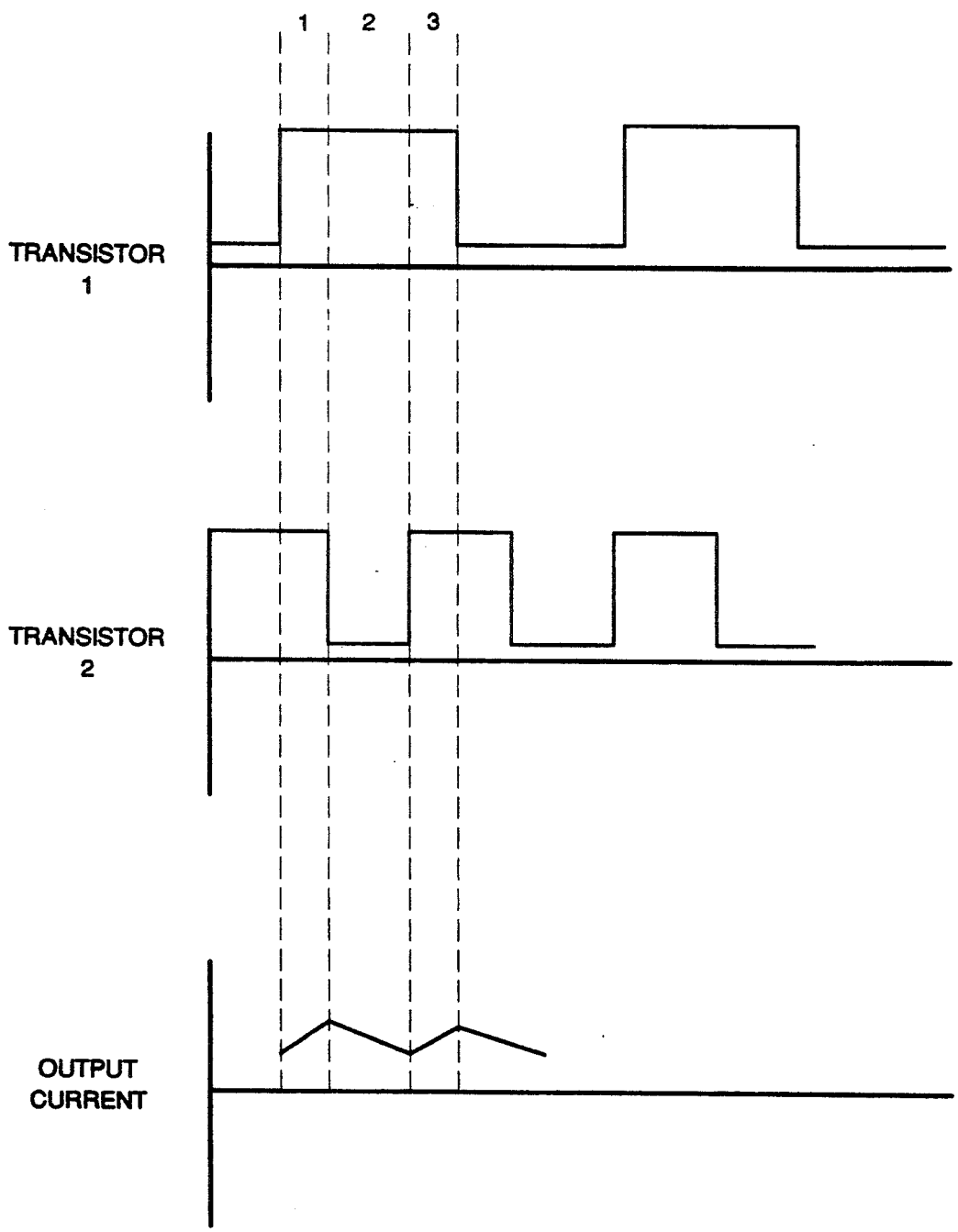
FIG. 15 are wave form/logic diagrams showing the logic states of the transistors and the output current for periods 1, 2 and 3 during the three-state acceleration.

FIG. 15 is a group of three graphs—one showing the current through transistor 1 for periods 1, 2 and 3, a second graph showing the current through transistor 2 for periods 1, 2 and 3 and the third graph being that of the output current. The frequency of the current to the motor 14 shown in FIG.15 is at twice the frequency of the triangular wave.

Figure 16A:
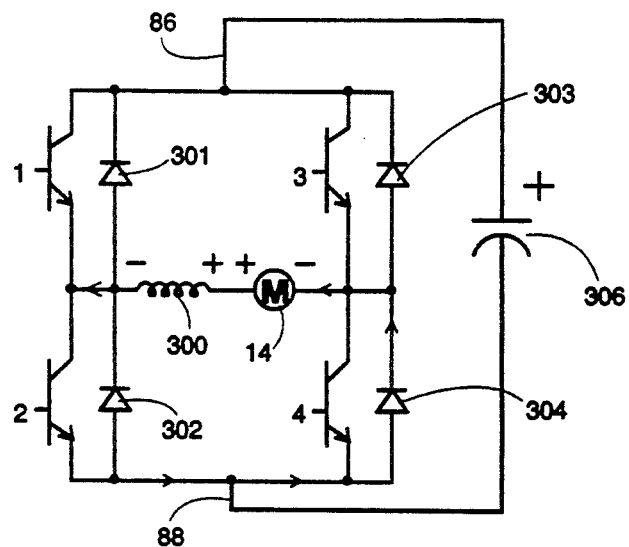
FIGS. 16A, 16B, and 16C are circuit diagrams of the power transistors motor and motor coil illustrating three periods during three-state back EMF deceleration.
Figure 16B:
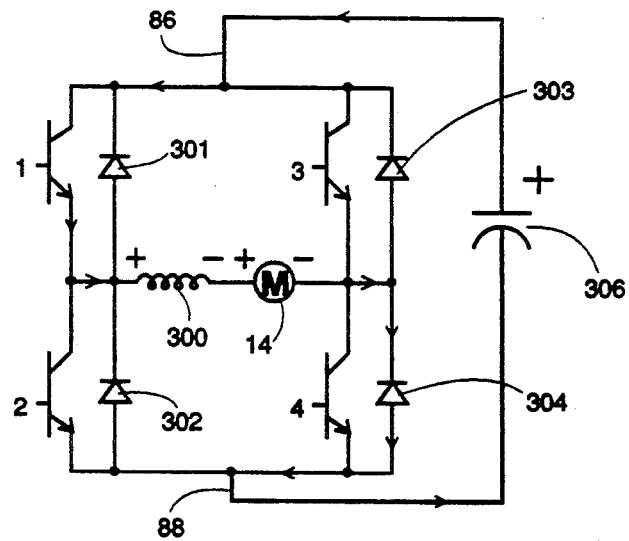
Figure 16C:
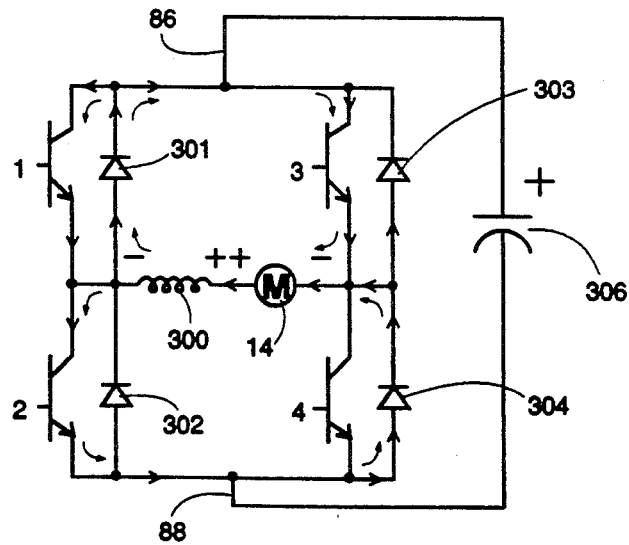

FIGS. 16A, 16B and 16C show the three state back EMF deceleration with the H bridge of power transistors 1-4.

Deceleration begins with the turning off of one of the opposing transistors, such as, for example, transistor 2 in the first period shown in FIG. 16A. In this condition, the positive terminal of the motor 14 is clamped to the negative bus 88 via transistor 2. Then the negative terminal of the motor 14 would like to go to the level of the terminal voltage across the motor lower than the positive terminal. However, the diode across transistor 4 will not allow this and the result is shorting of the motor for a controlled period of time.

The current flow is shown by the arrows and is across the collector and the emitter of the transistor 2 through the diode 304 and then through the motor 14 and through the back EMF of the motor 14 shown by the plus and minus symbols and through the coil 300 where the plus and minus symbols represent the inductive energy.

FIG. 16B shows the second period of deceleration which occurs after the turning off of transistor 2 off and the inductive energy in the load must be contended with, namely the inductive energy in the coil 300. This is achieved by "free wheeling" the energy through the bus capacitor 306.

Here the current flows across the collector and emitter of transistor 1 as shown by the arrow, through the coil 300 assisted by the back EMF of the motor 14, through the diode 304 to the negative bus 88, then through the capacitor 306 and back to the collector of transistor 1.

In this period 2, the inductive energy is placed in series with the rotational back EMF of the motor 14. In this period, the energy returns to the bus and regeneration occurs.

In FIG. 16C is shown the current flow through the power transistor H bridge in a third period which is the same as the first period except that the transistor 3 is now turned on. Here current can flow against the back EMF of the motor 14 and through the coil 300 in two paths—one being through the diode 301 and transistor 3 and the other being through diode 301, transistor 1, transistor 2 and diode 304, as shown.

As shown in FIG. 17, each of the outputs Q1-Q4 from the tri-state circuit is supplied through a crossover delay circuit 80 which includes an RC circuit comprising a resistor 320, a capacitor 322 connected to earth (ground) and a diode 324 connected in reverse polarity across the resistor 320 as shown.

The delay circuit 80 is defined by the resistor 320, capacitor 322 and diode 324 and the lockout circuit 82 is defined by an AND gate 326 shown in FIG. 18 at the input to the drive circuit 84.

Thus, each one of the outputs Q1-Q4 from the tri-state drive logic circuitry 78 passes through a delay circuit 80 then through an output line 15 to the AND gate 326.

As shown in FIG. 18, the output on conductor L15 is supplied to one input of the AND gate 326 and another conductor line L16 or L17 from the limit switch circuit 142 is coupled to another input of the AND gate 326.

Referring now to FIG. 18, the output from the AND gate 326 is supplied to the base drive circuit 84 and first of all to an optical coupler 328 thereof.

As shown, the drive circuit 84 includes a transformer 330, a diode bridge circuit 332 including series connected capacitors 334 and 336 which provide a reference voltage VR and a negative voltage −V.

The output from the optical coupler 328 is supplied to a control electronic switch 340, which is a FET that has its gate, G1, connected through a resistor 342 to the positive voltage bus +V. This control transistor 340 is connected between +V and −V and when conductive pulls down the voltage on the gates G2 and G3 of two electronic switches 344 and 346 which are FETs and which are connected across one of the bipolar power transistors, such as transistor I. With this circuit arrangement, the voltage on the base B of the power transistor 1 is never greater than the voltage at the collector C of the power transistor 1 thereby to prevent saturation of the base V and provide fast on and off switching times for the transistor 1. Further details concerning the construction, operation and advantages of the drive circuit 84 are disclosed in copending U.S. application Ser. No. 262,317, entitled, BASE DRIVE CIRCUIT, the disclosure of which is incorporated herein by reference.

In FIG. 19 is illustrated a start-up and delay circuit 138 which has an input coupled to the reset circuit 136 through a conductor line L20 to an output 350. The start-up and delay circuit 138 includes a first diode 351 connected in reverse polarity to the conductor line L20, and second and third diodes 352 and 353 series connected between the first diode 351 and the output 350. A junction between the diodes 352 and 353 is connected to a capacitor 356 which is connected to system ground.

A resistor 358 is connected across the second diode 352 and a resistor 360 is connected across the two diodes 352 and 353 as shown. A junction between the first diode 351 and the second diode 352 is coupled through an inverting amplifier 362 to the +12 volt bus.

The start-up delay circuit 138 provides a delay in the start-up to ensure that after the servo amplifier circuitry 44 has been reset all the capacitors in the subcircuits are discharged before the circuitry 44 is ready for use in the servo amplifier 10 for controlling the speed of the shaft 12 of the DC servo motor 14.

From the foregoing description, it will be apparent that the servo amplifier 10 of the present invention has a number of advantages some of which have been described above and others of which are inherent in the invention. Accordignly, the scope of the invention is only to be limited as necessitated by the accompanying claims.

I claim:

1. A servo amplifier for supplying current to a D.C. servo motor, said servo amplifier including a control signal input; a tach signal input; circuit means coupled to the signal inputs for creating an error signal between the control signal and the tach signal; a triangular wave generator for generating a triangular wave form; first means for summing the error signal with the triangular wave; means for modulating the resultant signal including first comparator means having one input for receiving the sum of the error signal and the triangular wave, another input connected to system common, and an output, inverting amplifier means for receiving and inverting said error signal, second means for summing the inverted error signal with the triangular wave, second comparator means having one input for receiving the sum of the error signal and the triangular wave, a second input connected to system common, and an output; tri-state drive logic circuitry having a first input for receiving a non-inverted signal and a second input for receiving an inverted signal and comprising a first invertor coupled to said first input, a second invertor coupled to said second output, a third invertor, the output of said first invertor being supplied to said third invertor for providing an output Q1, a fourth invertor also coupled to said second input and having an output Q2, a fifth invertor coupled to the output of said second invertor and having an otuput Q3, and a sixth invertor also coupled to said first input and having an output Q4; power transistors; and power transistor drive circuitry adapted to be coupled to said power transistors; said means for modulating being coupled to the output of said first and second summing means for supplying modulated signals form said outputs of said first and second comparator means to said first and second inputs of said tri-state drive logic circuitry, said tri-state drive logic circuitry having said Q1, Q2, Q3 and Q4 outputs coupled to said power transistor drive circuitry and said tri-state drive logic circuitry providing fast response to the error signals indicating a desired change in speed of the D.C. motor, and without over-shoot or hunting of the D.C. servo motor.

2. The servo amplifier of claim 1 including delay circuitry coupled to the outputs Q1–Q4.

3. The servo amplifier of cliam 2 including lockout circuitry coupled between the output of the delay circuitry and said base drive circuitry.

4. The servo amplifier of claim 1 including a start-up delay circuit for delaying start-up of said servo amplifier until capacitors in sub-circuits of said servo amplifier have discharged.

5. The servo amplifier of claim 1 wherein said circuit means for creating an error signal includes a current limit circuit and other sub-circuits which have switchable resistors and adjustable potentiometers, and the manually operable controls therefore being positioned adjacent the top of said servo amplifier for easy access by a user of said servo amplifier.

* * * * *